July 20, 1943.  W. W. CRILEY  2,324,613.
CLUTCH
Filed April 24, 1941
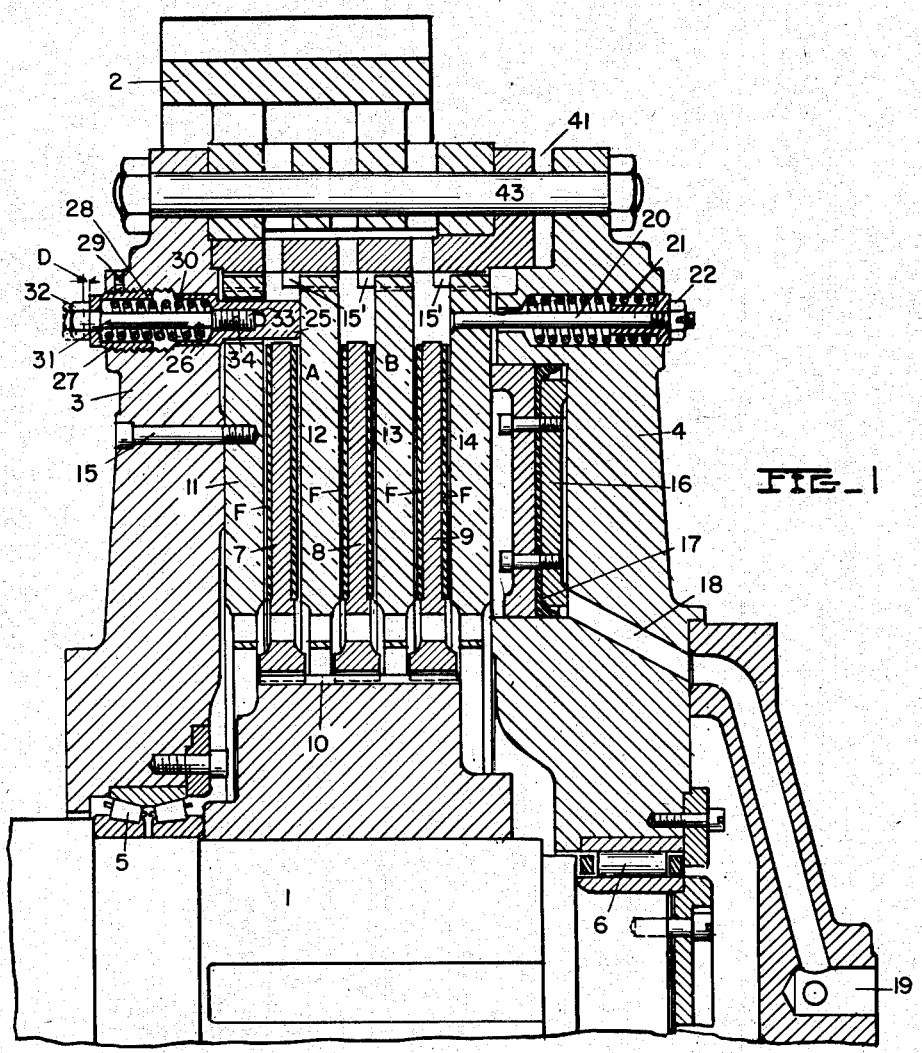
FIG_1
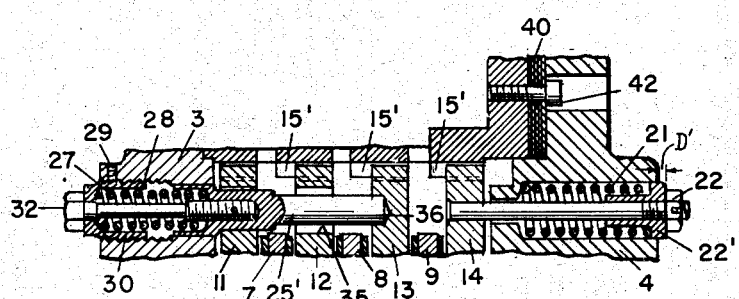
FIG_2
INVENTOR.
WILLIAM W. CRILEY
BY Oberlin, Limbach & Day
ATTORNEYS Patented July 20, 1943

2,324,613

UNITED STATES PATENT OFFICE 2,324,613

CLUTCH

William W. Criley, Shaker Heights, Ohio, assignor to The Ajax Manufacturing Company, Cleveland, Ohio, a corporation of Ohio Application April 24, 1941, Serial No. 390,093

11 Claims. (Cl. 192—69)

The present invention relates to an improvement in a friction type clutch wherein the engaging members consist of plate-like elements which are axially movable toward and away from each other, or packed and unpacked, under operating pressure, as the clutch is actuated into engaged and released positions, respectively.

My invention is particularly applicable to friction clutches of the multiple plate type in which there are a plurality of driving plates engaging with a plurality of driven plates.

It has been appreciated by those skilled in the art that it is desirable to provide some means for axially moving the clutch plates out of engagement with each other when the operating or packing pressure is released, other than mere reliance upon the tendency of the plates to move out of frictional contact with each other. Heretofore, coil and leaf springs have been mounted between alternate plates for the purpose of moving them out of contact upon clutch release and in order to prevent the driving plates from "riding on" or having slip contact with the driven plates, to avoid unnecessary wear of the friction-engaging surfaces of the plates. However, such prior expedients for moving the clutch plates into unengaged, free position have been subject to a disadvantage, in that the spring pressure is not uniform, balanced or controlled, with the result that not only will there be a tendency to "cock" or to throw an individual plate out of proper radial alignment, thus causing a binding in its axial movement supports, but also for one set of springs on a given plate to exert a greater total pressure than another set of springs on another plate, with the very opposite result of that which it was sought to achieve in the first place, i. e., one driving plate, although forced out of contact with a driven plate on one side, will, in turn, be forced into contact with a driven plate on its other side.

Furthermore, since considerable heat of friction is generated in the clutch plates themselves, it is transmitted directly to the springs which are mounted upon them, resulting in an annealing action or drawing of the temper of the metal of the springs, thus decreasing the originally exerted spring pressure.

It is, therefore, one of the objects of my invention to provide means for moving the clutch plates in a friction type clutch to a position where they will be positively free and separated from the adjacent plates, and with the elimination of the above outlined disadvantages.

It is a further object of my invention to provide such a clutch plate spacing means in which the amount of separating movement is uniform, predetermined and adjustable for each individual plate.

Still another object of my invention is to provide an indicating means which is accessible and visible from the exterior of the clutch and positively indicates the amount of axial movement of the individual clutch plates from engaged to released position within the interior of the clutch.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:

Fig. 1 is a sectional view taken along the axial center line of a half-portion of a clutch embodying my invention; and Fig. 2 is a detailed, sectional view taken upon a plane, radially removed from that of Fig. 1.

The clutch construction shown in the drawing is of the multiple plate, heavy duty type, which is particularly adapted for use on metal-forming machines, such as presses, forging machines and the like. The illustrated construction shows a driven shaft 1 upon which the driving element comprising a gear wheel or a fly wheel 2 is rotatably supported by means of the radially extending side wall portions 3 and 4. The side walls 3 and 4, in effect, constitute a "straddle housing" mounted upon the driven shaft 1 by means of the bearings 5 and 6, respectively.

A plurality of driven plates 7, 8 and 9 are mounted upon the shaft 1 and adapted to rotate therewith, but are axially slidable or movable thereon. The driven plates 7, 8 and 9, are thus suitably mounted on the shaft 1, by means of a spline fitting, as indicated at 10. Friction facings F are carried by both of the opposite faces of each of the plates 7, 8 and 9.

A plurality of driving plates 11, 12, 13 and 14 are alternately spaced with respect to the driven plates 7, 8 and 9. The plate 11 is attached to the housing wall 3 by means of the stud 15 and also keyed to the fly wheel proper by means of a tooth and slot fitting, as indicated at 15'. The driving plates 12, 13 and 14 are axially slidable or movable with respect to the driving element 2 and are likewise keyed to the latter by means of similar tooth and slot fittings 15'.

The driving plates 11, 12, 13 and 14 and the driven plates 7, 8 and 9 are shown in unpacked, released position in Fig. 1. Actuating means are provided for packing or axially compressing these driving and driven plates to effect clutch engagement. Such actuating means may suitably comprise an annular hydraulic piston 16 mounted in the annular cylinder 17 and into which fluid under pressure, such as oil or air is directed by means of the duct 18. The duct 18, of course, leads from the axial center line of the shaft 1 and is connected to a hydraulic pressure supply line (not shown) by suitable fitting or distributor mounted at the end 19 of the duct 18.

As the driving and driven plates are moved from packed to unpacked position, viz., when the actuating pressure is released upon the piston 16, it is highly desirable that their respective contacting surfaces be moved into a position clear and free from each other. A connecting rod 20 carried by the driving plate 14 and extending through the housing wall 4 is spring-loaded by the coil compression spring 21. The pressure exerted by the spring 21 is adjustable by means of the nut 22 threaded on the end of the rod 20. Only one of these connecting rods 20 is shown in Fig. 1, but it will be readily understood by those skilled in the art that a series of them, circumferentially spaced, are employed. The spring-loaded connecting rods 20 function to move the driving plate 14 as well as the piston 16 from unpacked position and clear of the driven plate 9, when the clutch-actuating pressure is released. However, the remaining driving plates 11, 12 and 13 and the driven plates 7 and 8 would not be moved to a free, unpacked position when the clutch is released if it were not for the positive movement spacing means provided by my invention and presently to be described. If no such positive movement spacing means were provided for moving the respective driving and driven plates out of contact with each other, they would be subject to the tendency of having their friction surfaces "riding" against themselves when the clutch is released, or when the driven shaft 1 is stationary and the driving element 2 rotating, thus generating unnecessary heat of friction in the clutch and resulting in wear and deterioration upon the friction-engaging parts. This undesirable tendency becomes particularly emphasized when there is a tight or binding fitting of the driving plates at their supporting points 15'.

To overcome this disadvantage I have provided means for positively moving the intermediate driving plates 12 and 13 to a uniform, predetermined position, free and clear of the driven plates 7, 8 and 9 when the clutch is in released position. Such means comprises a set of bars or plungers 25 (only one of which is shown in the drawing), which are circumferentially spaced and mounted in the cylindrical openings 26 in the side wall housing 3. An adjusting screw plug 27 is also mounted in the housing 3 and in longitudinal alignment with the plunger 25. The screw plug 27 is locked against rotation by means of a set screw 29.

A coil compression spring 30 is mounted between the inner end of the plunger 25 and the inner end of the adjusting screw plug 27. A spring check rod or stud 31 leads from the plunger 25 to the exterior of the plug 27. The head portion 32 on the check rod 31 abuts against the outer end of the plug 27 and thus limits the inward, axial or longitudinal movement of the plunger 25 with respect to the cup 27, and the side wall housing 3 to which it is attached. Adjustment of the screw plug 27 is also available if need be, to correct any variation after a period of use of the amount of spring pressure (i. e. in addition to the hereinafter described "pre-loading" adjustment of the pressure springs 30) that is to be transmitted from the coil spring 30 to the plunger 25. This adjustment is most advantageous in maintaining during the life of the clutch, the exertion of uniform separating pressure around the circumference of the driving plates, so that the axial movement of the latter tends to remain in proper alignment. Furthermore, it will be noted that such spring pressure adjustment or "load determination" may be made from the exterior of the clutch housing and without requiring the dismantling or disassembly of the clutch parts.

The check rod 31 is threadably engaged in the interior of the plunger 25, as indicated at 33, and a dowel pin 34 is provided to lock the rod 31 and the plunger 25 against relative rotation after the desired spring adjustment or pre-loading has been made.

The plunger 25, of course, extends through the axially fixed plate 11 and contacts at its inner end with the axially movable driving plate 12. As the plate 12 is moved to packed position when the clutch is actuated, it will also move the plunger 25 in a lefthand or outward direction against the pressure of the spring 30; and as the clutch-actuating pressure is released, the pressure of the spring 30 will, in turn, move the plate 12 back to its free and clear position, as shown in Fig. 1. The amount of the movement of the plate 12 will, in turn, be visibly indicated on the exterior of the clutch housing 3 by the distance D of the head 32 from the end of the cup 27. This distance D, in turn, is adjustable and predetermined by the longitudinal, fixed position of the adjusting screw plug 27 in the housing wall 3. In order to insure uniform, axial movement of the plate 12 and uniform application of pressure to it around its periphery, this adjustment is made so that the distance D is equal for each and every one of the plural number of circumferentially spaced plungers. A similar, visibly indicated movement of the clutch plate 14 is rendered available by the distance D' by which the collar 22' on the rod 20 extends beyond the surface of the housing side wall 4. The distance D' is suitably adjusted to be equal to three times the distance D.

Furthermore, the plunger 25 is pre-loaded to a predetermined, uniform spring pressure by means of adjusting the threaded engagement 33 between the stud 31 and the plunger 25. This adjustment is, of course, made before assembly of the plungers 25 and their related parts in the clutch housing, thus rendering it possible to test and check such adjusted spring pressures individually on a suitable testing machine.

Similar means are provided for positively moving the driving plate 13 to a free and clear position when the clutch is released and the respective plates unpacked. Thus, a series of plungers, similarly constructed to those just described, but having an elongated shank portion 25', extend through clearance openings 35 in the plate 12 and fit into sockets 36 in the plate 13. The plungers 25' operate in the same manner as the previously described plunger 25, except that their predetermined adjustment for longitudinal movement will be made twice that of the distance D, and two-thirds the distance D'. Thus, if the distance D is adjusted to one-eighth of an inch in a given clutch construction, the corresponding distance for the plungers 25' will be adjusted to one-fourth of an inch. This is for the reason that the innermost plate 13 must be moved twice the axial distance from the housing wall 3 as that of the plate 12, in order to provide the proper clearance space for the additionally interposed driven plate 8. Wear upon the surfaces of both the driving and driven clutch plates is conveniently compensated for by an adjusting means regulating the axial distance between the housing side walls 3 and 4. These adjustment means comprise a plurality of segmental plates or shims 40, which are mounted in the annular clearance space 41 between the housing side wall 4 and the flywheel 2. These segmental shims are normally held in place by fastening studs 42. It will thus be seen that the last-mentioned wear adjustment is conveniently accomplished by means of loosening the nuts on the tie bolts 43, unfastening the studs 42 and removing one or more layers of the segmental shims 40 and reassembling the studs 42 and re-tightening the nuts on the bolts 43. The axial thickness of the removed segmental plates 40 permits the housing side walls 3 and 4 to move axially closer together and thus determines the amount of clutch wear take-up.

It will thus be seen that my above-described invention provides a means for positively moving each one of the plurality of driving plates a uniform, predetermined distance when in released position, which distance is sufficient to render their contacting surfaces free and clear from the adjacent contacting surfaces of the driven plates. Furthermore, it will be noted that the coil compression springs are located at a point removed from the clutch plates themselves whereby the heat of friction generated therein cannot be directly transmitted to them to draw their temper and thus affect the spring pressures during the life of operation of the clutch. In other words, the coil springs are, in effect, insulated from the heat generating plates through the medium of the plungers 25 and 25', which are capable of absorbing and dissipating any such heat before it has an opportunity to reach the remotely disposed springs.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a clutch, driving and driven plates axially movable into and out of engagement with each other, one of said plates being located intermediate of the others, means for moving said plates into engagement, yieldable means contacting said one of said plates for urging it out of engagement with the others, means for limiting the movement of said yieldable means, said limiting means being directly connected to said yieldable means and projecting to the exterior of said clutch, and means for indicating the amount of movement of said yieldable means, said indicating means being visible on the exterior of said clutch, said indicating means being an integral part with said limiting means.

2. In a clutch, driving and driven plates axially movable into and out of engagement with each other, one of said plates being located intermediate of the others, means for moving said plates into engagement, yieldable means contacting said one of said plates for urging it out of engagement with the others, means for adjustably regulating the yieldable pressure exerted by said yieldable means and means for indicating the amount of movement of said yieldable means, said indicating means being visible on the exterior of said clutch and being directly connected to said yieldable means.

3. In a clutch, driving and driven plates axially movable into and out of engagement with each other, one of said plates being located intermediate of the others, means for moving said plates into engagement, yieldable means contacting said one of said plates for urging it out of engagement with the others, means for limiting the movement of said yieldable means, said limiting means being directly connected to said yieldable means and projecting to the exterior of said clutch, means for adjustably regulating the yieldable pressure exerted by said yieldable means and means for indicating the amount of movement of said yieldable means, said indicating means being visible on the exterior of said clutch and being directly connected to said yieldable means.

4. In a clutch, driving and driven plates axially movable into and out of engagement with each other, a housing enclosing said plates, means for moving said plates into engagement, a plurality of axially movable bars circumferentially spaced and mounted in a radial wall of said housing, springs urging said bars inwardly of said housing, said bars being adapted to contact said driving plates and axially adjustable abutment means also mounted in a radial wall of said housing and extending to the exterior thereof for limiting the extent of such inward movement.

5. In a clutch, driving and driven plates axially movable into and out of engagement with each other, a housing enclosing said plates, means for moving said plates into engagement, a plurality of axially movable bars circumferentially spaced and mounted in a radial wall of said housing, springs urging said bars inwardly of said housing, said bars being adapted to contact said driving plates, axially adjustable abutment means arranged between said bars and said housing for limiting the extent of such inward movement and means for adjusting the pressure exerted by said springs on said bars.

6. In a clutch, driving and driven plates axially movable into and out of engagement with each other, a housing enclosing said plates, means for moving said plates into engagement, a plurality of axially movable plungers circumferentially spaced and mounted in a radial wall of said housing, insert members also mounted in said housing in longitudinal alignment with said plungers, connecting rods extending from each of said plungers slidably through said insert members, said connecting rods having an exterior head portion adapted to abut against said insert members, compression springs mounted between said plungers and said insert members, and means for adjustably retaining said insert members in predetermined axial position in said housing.

7. In a clutch, driving and driven plates axially movable into and out of engagement with each other, a housing enclosing said plates, means for moving said plates into engagement, a plurality of axially movable plungers circumferentially spaced and mounted in a radial wall of said housing, insert members also mounted in said housing in longitudinal alignment with said plungers, connecting rods extending from each of said plungers slidably through said insert members, said connecting rods having an exterior head portion adapted to abut against said insert members, compression springs mounted between said plungers and said insert members, and means for adjustably retaining said insert members in predetermined axial position in said housing, said connecting rods threadably engaging said plungers whereby to regulate the pressure exerted by said springs.

8. In a multiple plate clutch, a plurality of driving plates and a plurality of driven plates, alternately disposed therebetween, a housing enclosing said plates, the latter being axially movable in one direction into packed engagement and in the opposite direction, to unpacked, released position, respectively, a plurality of sets of bars mounted in the wall of said housing, each of said sets of bars being adapted to contact with one of said driving plates, means for urging said bars in an axial direction to move said plates to such unpacked position and axially adjustable abutment means also mounted in a radial wall of said housing and extending to the exterior thereof for limiting the extent of such inner movement.

9. In a multiple plate clutch, a plurality of driving plates and a plurality of driven plates, alternately disposed therebetween, a housing enclosing said plates, the latter being axially movable in one direction into packed engagement and in the opposite direction, to unpacked, released position, respectively, a plurality of sets of bars mounted in the wall of said housing, each of said sets of bars being adapted to contact with one of said driving plates, means for urging said bars in an axial direction to move said plates to such unpacked position, axially adjustable abutment means arranged between said bars and said housing for limiting the extent of such inward movement and means for adjusting the pressure exerted by said springs on said bars.

10. In a multiple plate clutch, a plurality of driving plates and a plurality of driven plates, alternately disposed therebetween, a housing enclosing said plates, the latter being axially movable in one direction into packed engagement and in the opposite direction, to unpacked, released position, respectively, a plurality of sets of bars mounted in the wall of said housing, each of said sets of bars being adapted to contact with one of said driving plates, means for urging said bars in an axial direction to move said plates to such unpacked position, said set of bars contacting the innermost of said driving plates extending through and being independent of the outermost of said plates and axially adjustable abutment means also mounted in a radial wall of said housing and extending to the exterior thereof for limiting the extent of such inward movement.

11. In a multiple plate clutch, a plurality of driving plates and a plurality of driven plates, alternately disposed therebetween, a housing enclosing said plates, the latter being axially movable in one direction into packed engagement and in the opposite direction, to unpacked, released position, respectively, a plurality of sets of bars mounted in the wall of said housing, each of said sets of bars being adapted to contact with one of said driving plates, means for urging said bars in an axial direction to move said plates to such unpacked position, said set of bars contacting the innermost of said driving plates extending through and being independent of the outermost of said plates, axially adjustable abutment means arranged between said bars and said housing for limiting the extent of such inward movement and means for adjusting the pressure exerted by said springs on said bars.

WILLIAM W. CRILEY.